US010628187B2

(12) United States Patent
Anderson et al.

(10) Patent No.: US 10,628,187 B2
(45) Date of Patent: *Apr. 21, 2020

(54) CONTAINER RUNTIME SUPPORT

(71) Applicant: INTERNATIONAL BUSINESS MACHINES CORPORATION, Armonk, NY (US)

(72) Inventors: Jason L. Anderson, San Jose, CA (US); Kalonji K. Bankole, San Jose, CA (US); Andrew C. Bodine, Los Gatos, CA (US); Shaun T. Murakami, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/156,607

(22) Filed: Oct. 10, 2018

(65) Prior Publication Data

US 2019/0042287 A1 Feb. 7, 2019

Related U.S. Application Data

(63) Continuation of application No. 14/869,057, filed on Sep. 29, 2015, now Pat. No. 10,133,590.

(51) Int. Cl.
*G06F 9/455* (2018.01)
*G06F 9/48* (2006.01)
*G06F 9/50* (2006.01)

(52) U.S. Cl.
CPC .......... *G06F 9/455* (2013.01); *G06F 9/45504* (2013.01); *G06F 9/45516* (2013.01); *G06F 9/45533* (2013.01); *G06F 9/45558* (2013.01); *G06F 9/48* (2013.01); *G06F 9/485* (2013.01); *G06F 9/4843* (2013.01); *G06F 9/5077* (2013.01); *G06F 2009/45587* (2013.01)

(58) Field of Classification Search
CPC .. G06F 9/455; G06F 9/45504; G06F 9/45533; G06F 9/45558; G06F 2009/45587; G06F 9/48; G06F 9/4843; G06F 9/485
See application file for complete search history.

(56) References Cited

U.S. PATENT DOCUMENTS

| | | |
|---|---|---|
| 7,383,550 B2 | 6/2008 | Challenger |
| 7,562,341 B2 | 7/2009 | Kovachka-Dimitrova et al. |
| 7,646,725 B1 | 1/2010 | Soukup |
| 8,347,263 B1 | 1/2013 | Offer |
| 8,869,164 B2 | 10/2014 | Bobroff et al. |
| 8,966,464 B1 | 2/2015 | Christopher et al. |
| 2005/0060722 A1 | 3/2005 | Rochette |

(Continued)

OTHER PUBLICATIONS

Bill Venners, Inside the Java Virtual Machine, Chapter 5, www.artima.com/insidejvm/ed2/jvmP.html.

(Continued)

*Primary Examiner* — Charles M Swift
(74) *Attorney, Agent, or Firm* — Fred Grasso; Alexander G. Jochym

(57) ABSTRACT

Processes, machines, and manufactures involving adaptable containers that can be built and torn down more efficiently than VMs, may support various processes, and may be maintained without the presence of an active process. These adaptable containers may also be configured to support a process type and may support various processes at the same time as well. Other features and aspects are provided and taught.

15 Claims, 3 Drawing Sheets

(56) References Cited

U.S. PATENT DOCUMENTS

| | | |
|---|---|---|
| 2006/0053415 A1 | 3/2006 | Okmianski |
| 2007/0169005 A1 | 7/2007 | Drepper |
| 2008/0301677 A1 | 12/2008 | Park |
| 2009/0138886 A1 | 5/2009 | Anand |
| 2011/0134761 A1 | 6/2011 | Smith |
| 2011/0247005 A1 | 10/2011 | Benedetti |
| 2013/0024872 A1 | 1/2013 | Bobroff |
| 2013/0275969 A1 | 10/2013 | Dimitrov |
| 2014/0229951 A1 | 8/2014 | Zhang |
| 2014/0365554 A1 | 12/2014 | Bleau |
| 2016/0205175 A1 | 7/2016 | Chadha |

OTHER PUBLICATIONS

Dua et al. "Virtualization vs Containerization to support PaaS" 2014 IEEE International Conference on Cloud Engineering, Mar. 11-14, 2014, pp. 610-614 plus cover page.

Merkel, "Docker: Lightweight Linux Containers for Consistent Development and Deployment", ACM, Mar. 2014, pp. 1-5 plus cover page.

Wikipedia, Virtual Machine, (last modified) Sep. 5, 2015.

About Bosh, https://bosh.io/docs/about.html, (downloaded) Sep. 8, 2015.

Using Bosh, https://bosh.io/docs/using-bosh-init.html, (downloaded) Sep. 8, 2015.

CONTAINER RUNTIME SUPPORT

RELATED APPLICATION

This application is a continuation of U.S. application Ser. No. 14/869,057, which was filed on Sep. 29, 2015. The '057 application is now U.S. Pat. No. 10,133,590 and is entitled Container Runtime Support.

BACKGROUND

The present invention relates to process support in a computing environment and more specifically, to processes, machines, and manufactures involving use and/or maintenance of containers to support running processes where the containers are built or adapted for the running processes they support.

Virtual machines ("VMs") emulate an operating system (OS) running on hardware. For example an open standard operating system may have several virtual machines running on it where each of the VMs emulate a proprietary OS on which limited compatibility programs can run and function. Virtual machines have relatively long start up times and tear down times and involve linking to an underlying hypervisor. These hypervisors act to host the VM and translate back and forth to the underlying actual OS running directly on the hardware of the system supporting the VM.

Embodiments provide for improvement over VMs through the use of adaptable containers that can be built and torn down more efficiently than VMs, may support various processes, and may be maintained without the presence of an active process. Still other features and aspects are provided below and taught by this disclosure.

BRIEF SUMMARY

Processes, machines, and manufactures of embodiments can provide for adaptable containers that can be built and torn down more efficiently than VMs, may support various processes, and may be maintained without the presence of an active process. These adaptable containers may also be configured to support a process type and may support various processes at the same time as well. Other features and aspects, including network adaptations, are provided below and taught by this disclosure.

In embodiments containers may be created, maintained, or otherwise used or involved in supporting parallel runtimes of time-critical jobs with unique environment attributes running on a single operating system. In embodiments, remote system interaction through the containers may be provided and containers may be used to support multiple isolated instances of an application during runtime and in parallel in order to interact with remote systems or environment.

In embodiments, time-critical ephemeral jobs with different environment characteristic requirements (e.g. OS type, OS settings/variables, library dependencies, etc.) may be operated in parallel and on the same operating system through the use of one or more containers. Moreover, the jobs supported by the containers may also be resident in a different environment or system than the containers, which may, themselves, be operating together on the same OS.

In embodiments computer program products as well as methods may be employed. Each may provide for the creation of a first container in an operating environment on a first device where this first container may be configured to support a first process. The first container may have configuration parameters tailored to support environmental dependencies and resource dependencies of the first process. The first process may be resident on the same device as the container as well as be remote from the container on a different system or environment.

Each computer program product and method may also provide for the creation of a second container in an operating environment on a first device where this second container may be configured to support a second process. The second container may likewise have configuration parameters tailored to support any environmental dependencies and resource dependencies of the second process and this second process may itself be resident on the same device as the container as well as be remote from the second container on a different system or environment. In certain embodiments these first and second containers may operate in parallel, may not be virtual machines, and one or both may remain active, waiting for another process, even after the first or second process, for which they were created or were earlier supporting, is closed.

Certain containers in embodiments may be configured to remain open and support several jobs sequentially where the difference between jobs in the sequence is small or otherwise meets a filtering test. In other words, when a first job were to finish, the container supporting it may not also close but, instead may remain open, and may accept support for a new job that has similar environmental and resource dependencies. The dependencies need not be exact between the jobs as the containers may make adjustments for jobs without the need for closing themselves down and restarting.

In certain embodiments, the containers may be classified to support a type of job, such as a cut-paste function or a typeface translation and may remain open for a period of time after a job has finished to determine whether another similar job—of the same job type—is being opened and can be supported by the vacant container. As mentioned above, these same category jobs may be performed on the same device as the container and may also be performed apart from that device and be remote and resident on a different system or in a different environment. Still further modifications and permutations may be enabled and provided via the invention.

DETAILED DESCRIPTION

Figure 1:
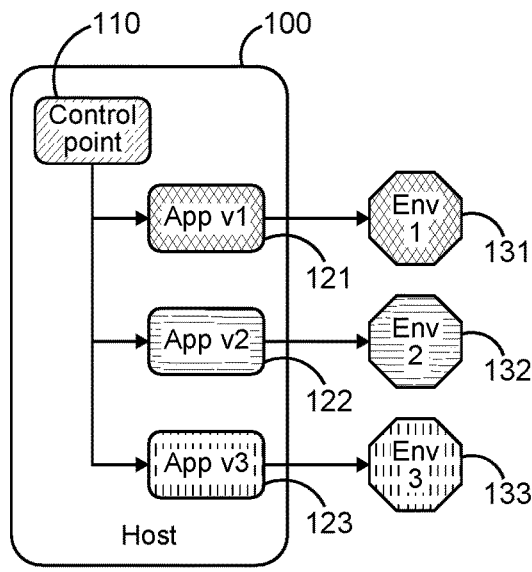
FIG. 1 shows a schematic of a host with multiple containers, each supporting a process in accord with embodiments.

Processes, machines, and manufactures involving adaptable containers that can be built and torn down more efficiently than VMs, may support various processes, and may be maintained without the presence of an active process. These adaptable containers may also be configured to support a process type and may support various processes at the same time as well. Other features and aspects are provided below and taught by this disclosure.

Embodiments may provide for methods to create ephemeral environments using system containers for time critical jobs and processes. These containers may allow each process to be completely isolated from its adjacent neighbors while allowing the container to be easily cleaned up after execution. Containers may address the time-critical aspect of the jobs since they may not need to wait for any operating system to boot and rather may be started instantaneously.

Embodiments can provide and support parallel runtimes for time-critical ephemeral jobs and/or processes with unique environment attributes running on a single system. Embodiments can comprise providing a controller for concurrently running multiple applications [e.g., processes, threads, etc.] with a first application requiring a first set of environment dependencies and for a second application [e.g., processes, threads, etc.] requiring a second set of environment dependencies different from the first set of environment dependencies on a system. Thus, a concurrent server virtualization method may allow for multiple isolated user space instances [e.g., containers, virtualization engines (VE), virtual private servers (VPS), jails, etc.] for the first application and the second application. These user space instances (e.g., jobs, processes, etc.) may be run on the server and may be apart from the sever in a different system or environment.

In embodiments, multiple isolated user space instances may be pooled for re-use against target OS environments based on aspects selected from a group consisting of client version, OS requirements, library requirements, dedicated requirements [for example, global variables, file systems], and time critical operations, etc. Thus, these pooled instances may be considered to have similar environmental and resource dependencies such that a container or group of containers can be designated to support these pooled instances. When one instance would finish, the container may remain open, may be adjusted for variations in dependencies of the anticipated new instance, and the new instance may be instantiated in the existing container to be supported therein. When remote processes are employed, the instance may be created in a different environment or system apart from the container and the container can serve as an interface for the local OS and the remote user instance (e.g., job, process, etc.) being supported by the container.

Containers may provide support for managing machine or other support services where some are more up to date than others, where system dependencies may not be exactly coincident, and where the system service is running and resources are difficult to manage from a distance. Furthermore, the potential for system library mismatch may also reduced through the version difference management described herein.

In embodiments a management server may act to have isolated interactions for each job or process. Multiple containers may be used on the server to interact with the remote machines and the associated supported jobs or processes. In so doing, different containers may be maintained locally while the processes they manage may be on remote servers. Thus the containers may be maintained locally and managed locally to handle different dependencies, or other issues. This management may include spinning up or tearing down containers in milliseconds, having a single container handle multiple servers, and supporting spawned processes of parent processes already being supported by containers.

In embodiments, parent processes can spawn processes being supported. When the parent process dies so do the child processes but the supporting containers may or may not be closed. Thus, while processes only run until they have work to do and terminate when the work is done, a container can remain dormant and maintain the allocated resources (e.g., environmental and dependencies) needed for the category of process, open and ready and available for a yet to be supported process. This can provide for quicker access to allocated resources for similar processes.

Embodiments may further include the use of a system containers to run multiple isolated instances of an application/runtime in order to interact with a remote system/environment; the re-use of a container instance to interact with similarly version dependent systems/endpoints; the scaled re-use of version dependent containers by pooling multiple containers of compatible versions; and the parallelization of non-parallelizable processes through the use of containers.

As an example, given a primary application—'A', and a dependent/$3^{rd}$ party application—'B' There are application(s) (A) that require/depend on other native applications (B) in order to function correctly or carry out tasks on behalf of the primary application (A). Operating Systems (OS) are sometimes limiting in nature when loading system/environment variables and libraries in order to support the requirements of application B. It is sometimes impossible/impractical to run multiple versions of an application (B) on a single OS. These type of applications may not have been built to support concurrent or different versions of the application's running instances. Instead through the use of containers these problems may be addressed and resolved.

Likewise, application A may also have time critical workloads or jobs for application B. In this case, it may be impractical to spin up a new virtual machine. In environments where the number of physical servers is limited, embodiments may provide for running multiple jobs (application B) on a limited number of servers or in some cases a single server/OS. Thus, in embodiments, container technology may be used to isolate client-side deployment operations that could otherwise result in dependency conflicts when faced with deploying multiple versions of an application. Embodiments can provide for client-side deployment applications where system dependencies that begin to conflict with changing versions of the application to be deployed, as managed and maintained though ephemeral containers. And, in embodiments, containers may be managed or coordinated and reused based on the target system's dependencies such that if a container is already deployed which meets the system dependency, an existing container can be reused. In embodiments, container pools may not be preferably homogenous. Instead, preferably, each container may be equipped for a different version of the invoked process.

In addition, in embodiments, a core runtime or application (labeled as the "control point") may be used. This core may call other "applications" or clients that can make calls to or invoke external environment actions. It is these "applications" that may run as open standard containers, whereby the contents for that "application" may be isolated from one another. Still further, embodiments, may use or re-use of these independent and isolated runtimes (aka "applications") as a way to proxy or communicate with one or more external "environments" or services. Open standard technologies may be employed in preferred embodiments, where containers encapsulate all the "application" dependencies within itself and allow for a main application (AKA "Control Point") to leverage one or more of the "applications"/clients to process jobs, tasks, etc. against external "environments" or services.

In preferred embodiments, the containers may be deployed on demand or re-used when empty by a "control point" or primary management application or host. The containers may be run on the host and may be run at other locations as well.

FIGS. 1-4 show the use of applications as container instances to target a corresponding environment with similar version dependencies. Background hashing shows further similarities. FIG. 1 shows each of the jobs 121, 122, and 123 deployed on the host 100 and created such as to execute remote process 131, 132, and 133 against a target environment. These jobs 121, 122, and 123, may only exist for the duration of the linked process and may then be destroyed. Overhead typically employed with VM environments may be avoided through the use of these containers. Additionally, resources which need to be used by each of the containers and the processes can be shared via the Control Point component. In embodiments, the containers 121, 122, and 123 may be created specifically for the remote processes 131, 132, and 133 so as to guarantee that a container is not contaminated from previous executions because each container may be, in such an example, be created specifically for the job. Moreover, in this on-to-one relationship, as well as in other embodiments, only the resources necessary for the job may be made available containers via the control point, which can be beneficial for increased security and reduced data corruptions (intentional and unintentional).

In embodiments, like that shown in FIGS. 1-4 other relationships may be established on the host by the control point as between the containers 121-123 and the processes 131-133. Moreover, various other flexibilities may also be accommodated in embodiments. These include containers supporting different versions of the same processes; containers supporting processes across and within different OSs and their specific requirements, containers supporting processes with different libraries and their associated requirements, containers accommodating global environmental variables for different processes, and containers supporting processes with dedicated file system requirements.

These various configurations may be offered and maintained for various reasons including a parent application/control point leveraging an application with different versions (as a container instance) in parallel, to interact with systems/environments with corresponding version dependencies. Furthermore, in a scenario where it may be necessary to use multiple runtime versions of a given application. The system or primary application can use container instances to interact with different runtime versions. More specifically, software such as BOSH (Cloud Foundry—BOSH outer Shell—) requires version compatibility between the CLI and the deployed runtime. BOSH CLI has a limitation where multiple versions or instances cannot run on the same system. To solve this issue, embodiments may employ an open standard container, such as Linux, to host various BOSH CLI versions. These container instances can then be re-used to interact with corresponding environments that depend on the given version.

Figure 2:
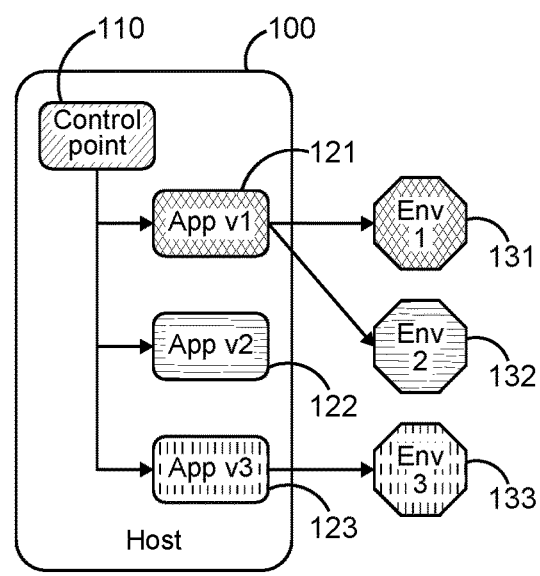
FIG. 2 shows a schematic of the host of FIG. 1 with a dormant container and other containers supporting processes in accord with embodiments.

FIG. 2 shows the re-use of application as container instances, to target one or more environments with similar version dependencies. As can be seen in FIG. 2, the container 121 is supporting two processes 131 and 132 and the container 122 is open but is not supporting an process. Container 122 may remain open for a period of time, holding resources, in anticipation of receiving another container, similar to 132, for support.

Figure 3:
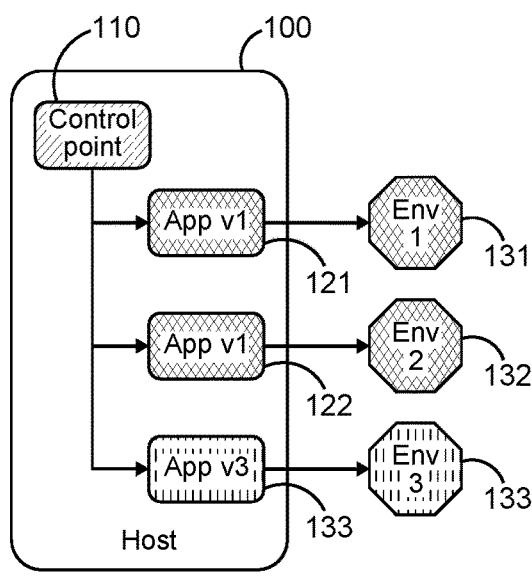
FIG. 3 shows a schematic of the host of FIG. 1 with mirrored containers and another container supporting processes in accord with embodiments.

FIG. 3 shows how a container 122 may be adjusted to support a process. Rather than sit idle, the container 122 was adjusted to become compatible with process 132 and in so doing container 121 need no longer support two processes. Thus, FIG. 3 shows the ability of embodiments to run multiple application instances in parallel (as a container instances), to target environments with similar version dependencies.

Figure 4:
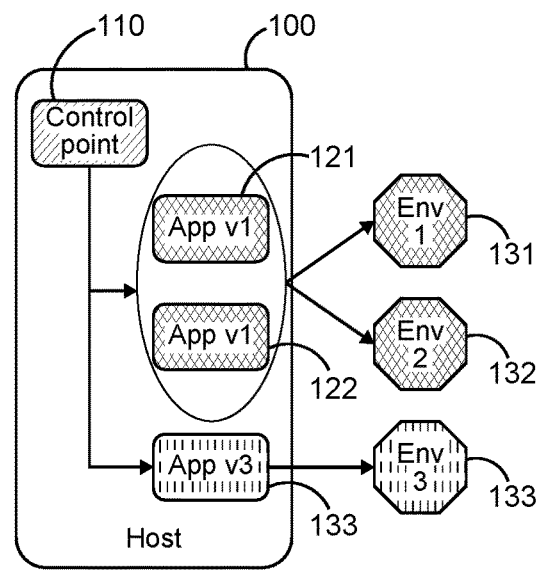
FIG. 4 shows a schematic of the host of FIG. 1 with redundant containers and another container supporting processes in accord with embodiments.

FIG. 4 shows the ability to cluster multiple application instances (as a container instances), to target environments with similar version dependencies. As can be seen in FIG. 4, containers 121 and 122 are clustered and processes 131 and 132 are supported by this cluster. Thus, embodiments may also cluster containers for efficiency or redundancy or for other purposes when supporting processes.

Figure 5:
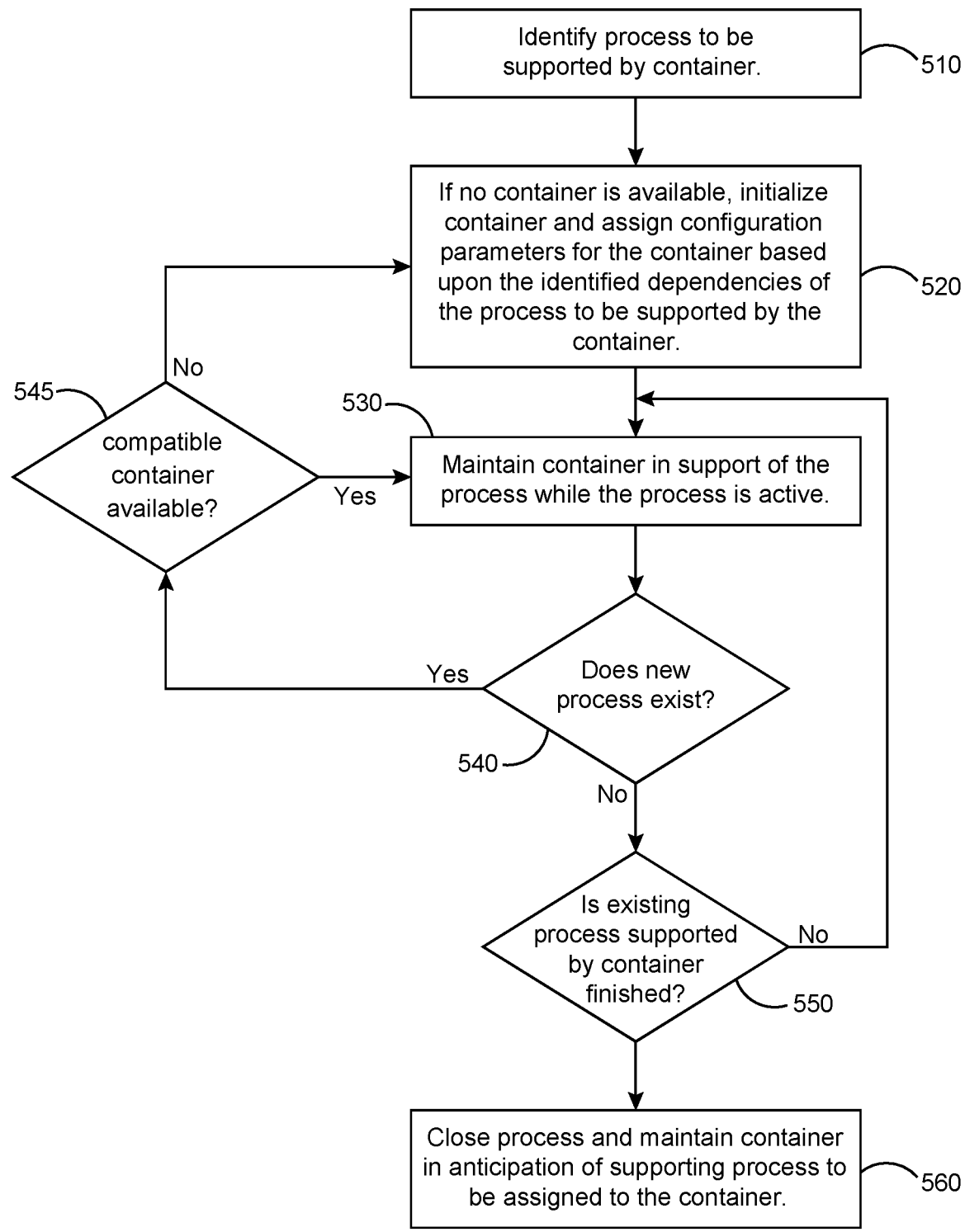
FIG. 5 shows a method involving container maintenance and process support in accord with embodiments.

FIG. 5 shows a method as may be employed in part, in full, and in various other permutations in accord with embodiments. This method may be carried out in part or in whole on the host of FIGS. 1-4 and on a single component or across many components of FIG. 6. The method may include identifying a process to be supported by a container, and if no container is available, initiating a container to support the process. This initiation may include considering the identified dependencies of the process to be supported. As shown at 530, the container may be maintained in support while the process is active. A cycle may also be conducted looking for initiation of new processes, see 540. If one is found and no container is available, a new container may be initiated, as shown at 520. If one is found and a container is available, see 545, and is compatible the process can be supported by the available container, as shown at 530.

As shown at 550, when no new processes are being instituted, existing containers can be monitored to determine whether any processes being supported are finished or in the steps of being finished. And, when a process is finished, as shown at 560, the container may be maintained in an open state, with its linked resources in the ready, poised to receive another process with dependencies exactly like or similar to those linked to the waiting container.

Figure 6:
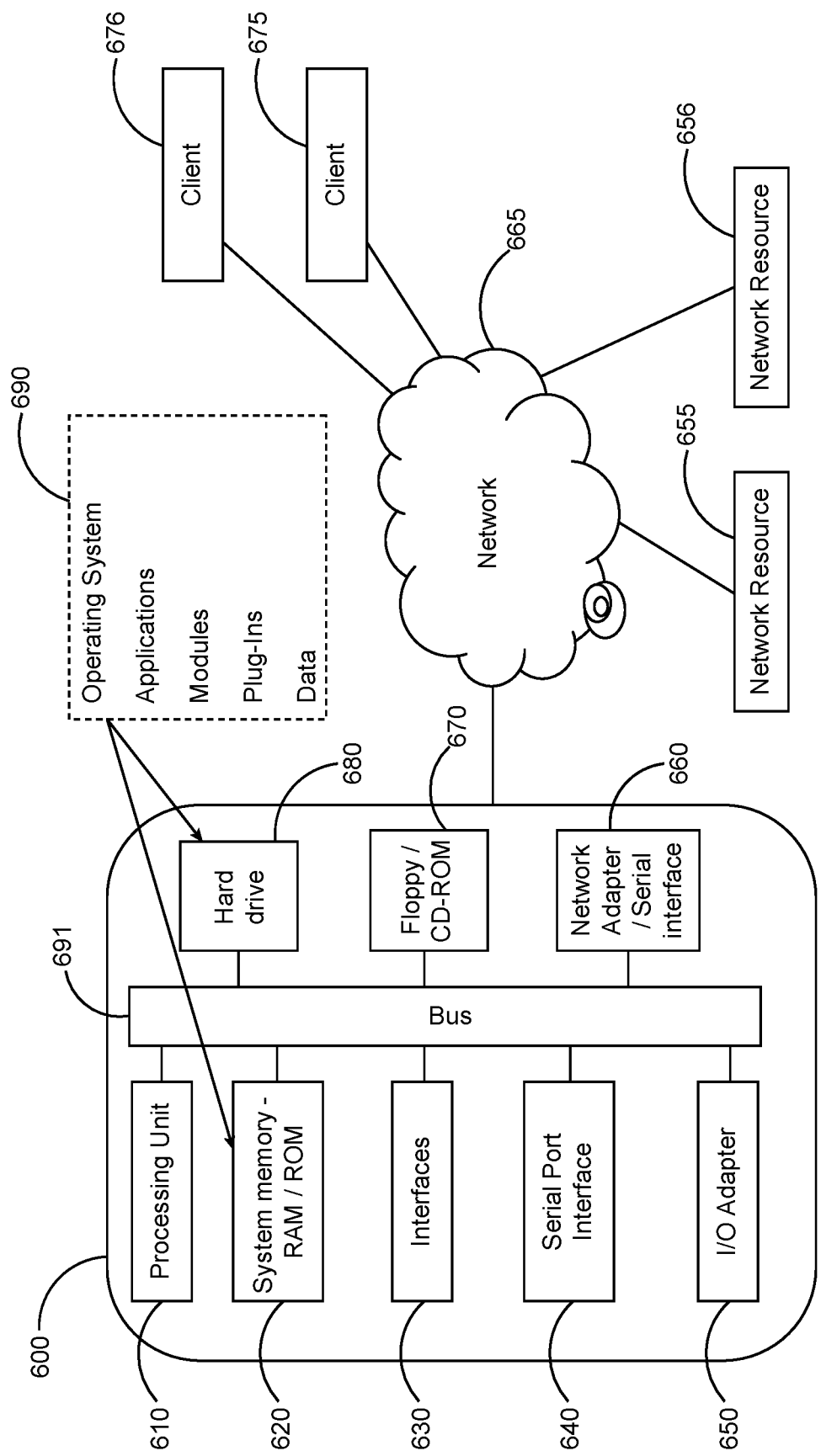
FIG. 6 show a system, including a computer, network, clients, and resources as may be employed in embodiments.

FIG. 6 illustrates a basic block diagram of a computing system and network as may be employed in embodiments of the present invention. A computer (600) includes a CPU (610) and a main memory (620) connected to a bus (691). The CPU (610) is preferably based on the 32-bit or 64-bit architecture. For example, the Core i™ series, the Core 2™ series, the Atom™ series, the Xeon™ series, the Pentium® series, or the Celeron® series of Intel Corporation or the Phenom™ series, the Athlon™ series, the Turion™ series, or Sempron™ of AMD may be used as the CPU (610). A display such as a liquid crystal display (LCD) may be connected to the bus (691) via adapter 650. The display is used to display, for management of computers, information on a computer connected to a network via a communication line and information on software running on the computer using an appropriate graphics interface. A storage unit (680) such as a hard disk or solid state drive and a drive (670) such as a CD, DVD, or BD drive may be connected to the bus (691) via an SATA or IDE controller. Moreover, a keyboard and a mouse may be connected to the bus (691) via an interface 640 or a USB bus.

An operating system, programs providing a Java® processing environment, Java® applications, a Java® virtual machine (JVM), and a Java® just-in-time (JIT) compiler, such as J2EE, other programs, and data are stored in the storage unit to be loadable to the main memory. The drive is used to install a program from a CD-ROM, DVD-ROM, or BD to the storage unit as necessary. A communication interface is based on, for example, the Ethernet® protocol. The communication interface is connected to the bus via a communication controller, physically connects the computer to a communication line, and provides a network interface layer to the TCP/IP communication protocol of a communication function of the operating system of the computer. In this case, the communication line may be a wired LAN environment or a wireless LAN environment based on wireless LAN connectivity standards, for example, IEEE 802.11a/b/g/n. The hard drive 418 and system memory 412 may have stored thereon the operating system, applications, modules, plug-ins and data of 690.

The network resources 655-656 may be connected to the computer 600 via the network 665. Likewise, the clients 675-676, which may be running the editor on a thin client via the network 665, may be reaching the computer, which can be a server, via the network 665. In embodiments, the containers may be configured by the CPU 610 and the processes being supported may reside in the clients 675-676 and/or the resources 655-656. Other configurations may also be possible.

The process software (container runtime support) is shared, simultaneously serving multiple customers in a flexible, automated fashion. It is standardized, requiring little customization, and it is scalable, providing capacity on demand in a pay-as-you-go model. The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload. The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider. In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

The process software (container runtime support) may be deployed, accessed and executed through the use of a virtual private network (VPN), which is any combination of technologies that can be used to secure a connection through an otherwise unsecured or untrusted network. The use of VPNs improves security and reduces operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e., the software resides elsewhere), wherein the lifetime of the VPN is limited to a given period of time or a given number of deployments based on an amount paid.

The process software may be deployed, accessed, and executed through either a remote-access or a site to-site VPN. When using the remote-access VPNs, the process software is deployed, accessed, and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download, and execute the process software.

When using the site-to-site VPN, the process software is deployed, accessed and executed through the use of dedicated equipment and large-scale encryption used to connect a company's multiple fixed sites over a public network, such as the Internet.

The process software is transported over the VPN via tunneling, which is the process of placing an entire packet within another packet and sending it over a network. The protocol of the outer packet is understood by the network and both points, called tunnel interfaces, where the packet enters and exits the network.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The present invention may be a system, a method, and/or a computer program product. The computer program product may include a computer readable storage medium (or media) having computer readable program instructions thereon for causing a processor to carry out aspects of the present invention.

The computer readable storage medium is a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A computer system configured to provide parallel runtime support using containers, the runtime support including a process comprising:
creating a first container instance in an operating environment on a first device, the first container instance configured to support a first process, the first process having environmental dependencies or resources dependencies or both, the first container instance having configuration parameters tailored to support the environmental dependencies and resource dependencies of the first process; and
creating a second container instance in said operating environment on the first device, the second container instance configured to support a second process, the second process having environmental dependencies or resource dependencies or both, the second container instance having configuration parameters tailored to support the environmental dependencies and resource dependencies of the second process,
wherein the first container instance is not a virtual machine, and
wherein the first container instance remains active, waiting for a new process, after the first process has completed and is closed, wherein the configuration parameters of the first container instance are no cleared and are adjusted for variations in environmental dependencies or resource dependencies to become compatible with a new process.

2. The computing system of claim 1 wherein the first process and the second process have both environmental dependencies and resource dependencies of their own and wherein dependencies shared by the first process and the second process are shared via a control point.

3. The computing system of claim 1 wherein the first process comprises one or more of: a file upload, a file copy, a file paste, a proxy for interaction with a system or environment remote and apart from the first device, or an executable self-designating what system resources are to be reserved for itself.

4. The computing system of claim 1 wherein the first process comprises: spawning of multiple threads or spawning of one or more sub-processes or both.

5. The computing system of claim 4 wherein the first process spawns multiple threads, the multiple threads sharing two or more of the same resources.

6. The computing system of claim 1 wherein the configuration parameters of the first container instance and the configuration parameters of the second container instance change independently of each other when either container is being reused after a process supported by the container instance has concluded.

7. The computing system of claim 1 wherein the CPU usage and memory usage of a microprocessor are configuration parameters of the first process and the second process and these configuration parameters are specifically allocated for the first process and the second process.

8. The computing system of claim 1 wherein the first container instance and the second container instance do not interact with an underlying hypervisor layer.

9. The computing system of claim 1 wherein the first container instance is tailored to have configuration files and executable files, for the specific process targeted to run in the first container instance.

10. The computing system of claim 1 wherein the first and second container instances share the same device kernel and wherein the first and second container instances support a process involving a computer remote from a host, the computer remote from the host running an operating system different than the operating system of the host.

11. The computing system of claim 1 wherein the first and second container instances are coequal and provide redundancies.

12. The computing system of claim 1 wherein for a period of time, the first container instance is maintained but is not supporting a process.

13. The computing system of claim 1 wherein resources allocated for the first process do not overlap with resources allocated for the second process.

14. A computer server network providing parallel runtime support using containers, the computer server network configured to perform a process comprising:
create a first container instance in an operating environment on a first device, the first container instance configured to support a first process, the first process having environmental dependencies or resource dependencies or both, the first container instance having configuration parameters tailored to support the environmental dependencies and resource dependencies of the first process,
wherein the first container instance is not a virtual machine, and
wherein the first container instance remains active, waiting for a new process, after the first process has completed and is closed, the configuration parameters of the first container instance are not cleared and are adjusted for variations in environmental dependencies or resource dependencies to become compatible with a new process.

15. The computing server network of claim 14 wherein the instructions are readable to also cause one or more device to reuse the container instance for a new process when the process previously supported by the container instance is complete.

* * * * *